United States Patent
Yi et al.

(10) Patent No.: US 12,277,645 B2
(45) Date of Patent: Apr. 15, 2025

(54) METHOD AND APPARATUS FOR CONSTRUCTING THREE-DIMENSIONAL CHANNEL, AND NON-TRANSITORY COMPUTER-READABLE RECORDING MEDIUM

(71) Applicants: Hong Yi, Beijing (CN); Haijing Jia, Beijing (CN); Hengzhi Zhang, Beijing (CN); Liyan Liu, Beijing (CN); Wei Wang, Beijing (CN)

(72) Inventors: Hong Yi, Beijing (CN); Haijing Jia, Beijing (CN); Hengzhi Zhang, Beijing (CN); Liyan Liu, Beijing (CN); Wei Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 204 days.

(21) Appl. No.: 18/155,159

(22) Filed: Jan. 17, 2023

(65) Prior Publication Data
US 2023/0230316 A1 Jul. 20, 2023

(30) Foreign Application Priority Data
Jan. 17, 2022 (CN) .......................... 202210048805.8

(51) Int. Cl.
*G06T 17/00* (2006.01)
*G06T 7/60* (2017.01)
(Continued)

(52) U.S. Cl.
CPC .............. *G06T 17/00* (2013.01); *G06T 7/60* (2013.01); *G06V 10/25* (2022.01); *H04N 23/698* (2023.01);
(Continued)

(58) Field of Classification Search
CPC . G06T 2207/10028; G06T 2207/20081; G06T 2207/20084; G06T 7/60;
(Continued)

(56) References Cited

U.S. PATENT DOCUMENTS

| | | | |
|---|---|---|---|
| 11,348,269 B1 * | 5/2022 | Ebrahimi Afrouzi ... | G01S 17/48 |
| 2013/0070048 A1 * | 3/2013 | Huang ................... | G01B 11/16 |
| | | | 348/36 |

(Continued)

OTHER PUBLICATIONS

Kim, Hansung, Teofilo De Campos, and Adrian Hilton. "Room layout estimation with object and material attributes information using a spherical camera." 2016 Fourth International Conference on 3D Vision (3DV). IEEE (Year: 2016).*

(Continued)

*Primary Examiner* — Hilina K Demeter
(74) *Attorney, Agent, or Firm* — IPUSA, PLLC

(57) ABSTRACT

A method and an apparatus for constructing a three-dimensional channel, and a non-transitory computer-readable recording medium are provided. In the method, a depth image corresponding to a first panoramic image is generated. Then, channel object detection is performed on the first panoramic image to obtain channel object boxes in the first panoramic image. Each of the channel object boxes is four annularly interconnected arc-shaped sides, and each of the arc-shaped sides is a circular arc of a great circle. Then, a three-dimensional point cloud of a channel object in the first panoramic image is generated based on the first panoramic image, the channel object boxes and the depth image.

9 Claims, 9 Drawing Sheets

(51) Int. Cl.
  *G06V 10/25*  (2022.01)
  *H04N 23/698*  (2023.01)
(52) U.S. Cl.
  CPC .............. *G06T 2207/10028* (2013.01); *G06T 2207/20084* (2013.01); *G06V 2201/07* (2022.01)
(58) Field of Classification Search
  CPC .. G06N 3/02; G06N 3/08–0985; G06V 10/25; G06V 2201/07; H04N 23/698
  See application file for complete search history.

(56) References Cited

U.S. PATENT DOCUMENTS

| | | | | |
|---|---|---|---|---|
| 2015/0341552 | A1* | 11/2015 | Chen .................. | G06T 11/60 348/38 |
| 2019/0004533 | A1* | 1/2019 | Huang ................ | G01S 17/86 |
| 2022/0198750 | A1* | 6/2022 | Zhou .................. | G06T 3/16 |
| 2023/0032888 | A1* | 2/2023 | Li ...................... | G06V 10/44 |
| 2023/0138762 | A1* | 5/2023 | Lambert ............ | G01C 21/206 382/103 |

OTHER PUBLICATIONS

Meng, Ming, et al. "Distortion-aware room layout estimation from a single fisheye image." 2021 IEEE International Symposium on Mixed and Augmented Reality (ISMAR). IEEE (Year: 2021).*

Zeng, Wei, Sezer Karaoglu, and Theo Gevers. "Pano2Scene: 3D Indoor Semantic Scene Reconstruction from a Single Panorama Image." Science 2 (Year: 2020).*

Zhang, Cheng, et al. "Deeppanocontext: Panoramic 3d scene understanding with holistic scene context graph and relation-based optimization." Proceedings of the IEEE/CVF International Conference on Computer Vision (Year: 2021).*

Hansung et al., "Room Layout Estimation with Object and Material Attributes Information using a Spherical Camera" (Year: 2016).*

Ming et al., "Distortion-aware Room Layout Estimation from a Single Fisheye Image" (Year: 2021).*

Zeng et al., "PanosScene: 3D Indoor Semantic Scent Reconstruction from a Single Panorama Image" (Year: 2020).*

Zhang et al., "Deeppanocontext: Panormaic 3D Scene Understanding with Holistic Scene Context Graph and Relation-Based Optimization" (Year: 2021).*

* cited by examiner

METHOD AND APPARATUS FOR CONSTRUCTING THREE-DIMENSIONAL CHANNEL, AND NON-TRANSITORY COMPUTER-READABLE RECORDING MEDIUM

CROSS-REFERENCE TO RELATED APPLICATIONS

The present application claims priority under 35 U.S.C. § 119 to Chinese Application No. 202210048805.8 filed on Jan. 17, 2022, the entire contents of which are incorporated herein by reference.

BACKGROUND OF THE INVENTION

1. Field of the Invention

The present disclosure relates to the field of image processing and three-dimensional reconstruction, and specifically, a method and an apparatus for constructing a three-dimensional channel, and a non-transitory computer-readable recording medium.

2. Description of the Related Art

In the field of three-dimensional reconstruction, three-dimensional channel reconstruction is a very important branch field. A channel usually refers to an object such as a door or a window that humans can pass through or see through. The application of three-dimensional channel reconstruction technology is very extensive. For example, when a laser scanner or a visible light camera is used to generate a point cloud, because the laser or visible light can pass through a channel region, the noise in the channel region is often very serious, so the point cloud can be processed using three-dimensional channel information. In addition, currently popular technologies such as robots or smart wheelchairs also use the channel information to plan routes.

In conventional methods, there are mainly three types of technologies for three-dimensional channel reconstruction to generate a three-dimensional channel point cloud, namely, a three-dimensional point cloud of a channel. Three-dimensional point cloud (3D point cloud) refers to a dataset of three-dimensional coordinate points arranged in regular grids.

For example, the first type of technology is to perform three-dimensional channel reconstruction directly on the three-dimensional point cloud. Due to the poor quality of the current point cloud, which includes many holes and noise, especially in the channel region, it is difficult to generate a high-quality three-dimensional channel point cloud from such a three-dimensional point cloud.

As another example, a data source for generating a point cloud is used to perform the three-dimensional channel reconstruction. One common data source is two-dimensional perspective view, and the second type of technology is to perform three-dimensional channel reconstruction based on a two-dimensional perspective view. There are two modes of thinking, one is forward thinking and the other is backward thinking. Forward thinking means that in a case where a two-dimensional perspective image has been previously obtained, a two-dimensional channel object is detected from a previously obtained two-dimensional perspective image, and then a three-dimensional channel point cloud is generated. Backward thinking means that in a case where only a three-dimensional point cloud exists, first a two-dimensional perspective view is generated from the three-dimensional point cloud, then a two-dimensional channel object is detected, and then a three-dimensional channel point cloud is generated. The main problem of such a technology is that there is usually panoramic distortion in panoramic images, thus a rectangular box adopted by two-dimensional object detection is no longer suitable for panoramic images.

As another example, another data source for generating point clouds is panoramic images, and the third type of technology is to detect a two-dimensional channel object in a panoramic image and then generate a three-dimensional channel point cloud. Considering the distortion of panoramic images, spherical convolution or deformable convolution is usually used to detect a curved polygonal box of an object. However, in addition to considering panoramic distortion, there is also perspective changes of an object itself in a physical world. Therefore, it is difficult to solve the problem of the perspective changes using spherical convolution or deformable convolution.

SUMMARY OF THE INVENTION

According to an aspect of the present disclosure, a method for constructing a three-dimensional channel is provided. The method includes generating a depth image corresponding to a first panoramic image; performing channel object detection on the first panoramic image to obtain channel object boxes in the first panoramic image, each of the channel object boxes being four annularly interconnected arc-shaped sides, and each of the arc-shaped sides being a circular arc of a great circle; and generating, based on the first panoramic image, the channel object boxes and the depth image, a three-dimensional point cloud of a channel object in the first panoramic image.

According to another aspect of the present disclosure, an apparatus for constructing a three-dimensional channel is provided. The apparatus includes a memory storing computer-executable instructions; and one or more processors. The one or more processors are configured to execute the computer-executable instructions such that the one or more processors are configured to generate a depth image corresponding to a first panoramic image; perform channel object detection on the first panoramic image to obtain channel object boxes in the first panoramic image, each of the channel object boxes being four annularly interconnected arc-shaped sides, and each of the arc-shaped sides being a circular arc of a great circle; and generate, based on the first panoramic image, the channel object boxes and the depth image, a three-dimensional point cloud of a channel object in the first panoramic image.

According to another aspect of the present disclosure, a non-transitory computer-readable recording medium having computer-executable instructions for execution by one or more processors is provided. The computer-executable instructions, when executed, cause the one or more processors to carry out the method for constructing a three-dimensional channel described above.

BRIEF DESCRIPTION OF THE DRAWINGS

The above and other objects, features and advantages of the present disclosure will be further clarified the following detailed description of embodiments of the present disclosure in combination with the drawings.

DESCRIPTION OF THE EMBODIMENTS

In the following, specific embodiments of the present disclosure will be described in detail with reference to the accompanying drawings, so as to facilitate the understanding of technical problems to be solved by the present disclosure, technical solutions of the present disclosure, and advantages of the present disclosure. The present disclosure is not limited to the specifically described embodiments, and various modifications, combinations and replacements may be made without departing from the scope of the present disclosure. In addition, descriptions of well-known functions and constructions are omitted for clarity and conciseness.

Note that "one embodiment" or "an embodiment" mentioned in the present specification means that specific features, structures or characteristics relating to the embodiment are included in at least one embodiment of the present disclosure. Thus, "one embodiment" or "an embodiment" mentioned in the present specification may not be the same embodiment. Additionally, these specific features, structures or characteristics may be combined in any suitable manner in one or more embodiments.

Note that steps of the methods may be performed in sequential order, however the order in which the steps are performed is not limited to a sequential order. Further, the described steps may be performed in parallel or independently.

In view of the problem of the conventional technology, an object of the embodiments of the present disclosure is to provide a method and an apparatus for constructing a three-dimensional channel, and a non-transitory computer-readable recording medium, which can improve the quality of the generated three-dimensional channel point cloud.

In an embodiment of the present disclosure, a three-dimensional channel constructing method, which can generate a three-dimensional channel point cloud based on a panoramic image, is provided. In a process of generating the three-dimensional channel point cloud according to the embodiment of the present disclosure, both panoramic distortion and perspective changes of an channel object itself are considered, thereby improving the quality of the generated the three-dimensional channel point cloud.

Figure 1:
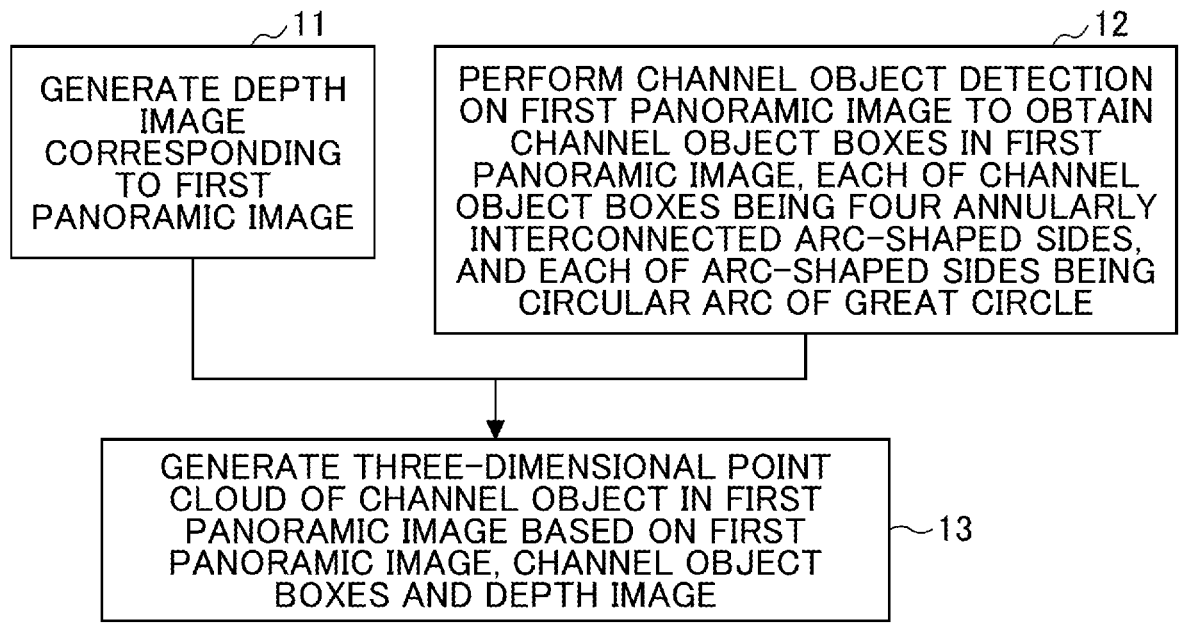
FIG. 1 is a flowchart illustrating an example of a three-dimensional channel constructing method according to an embodiment of the present disclosure.

FIG. 1 is a flowchart illustrating an example of the three-dimensional channel constructing method according to the embodiment of the present disclosure. As shown in FIG. 1, the three-dimensional channel constructing method includes steps 11 to 13.

In step 11, a depth image corresponding to a first panoramic image is generated.

In the embodiment of the present disclosure, monocular depth estimation may be performed on the first panoramic image to obtain the depth image. Here, a resolution of the depth image is identical to a resolution of the first panoramic image. Specifically, in this step, the monocular depth estimation may be performed using a known deep learning method in the field of depth prediction of the monocular first panoramic image, such as a BiFuse method. Each pixel in the depth image includes coordinate information of the pixel in a three-dimensional space. In the embodiments of the present disclosure, the three-dimensional point cloud may be visualized using a known method.

In step 12, channel object detection is performed on the first panoramic image to obtain channel object boxes in the first panoramic image. Here, each of the channel object boxes is four annularly interconnected arc-shaped sides, and each of the arc-shaped sides is a circular arc of a great circle.

Figure 2:
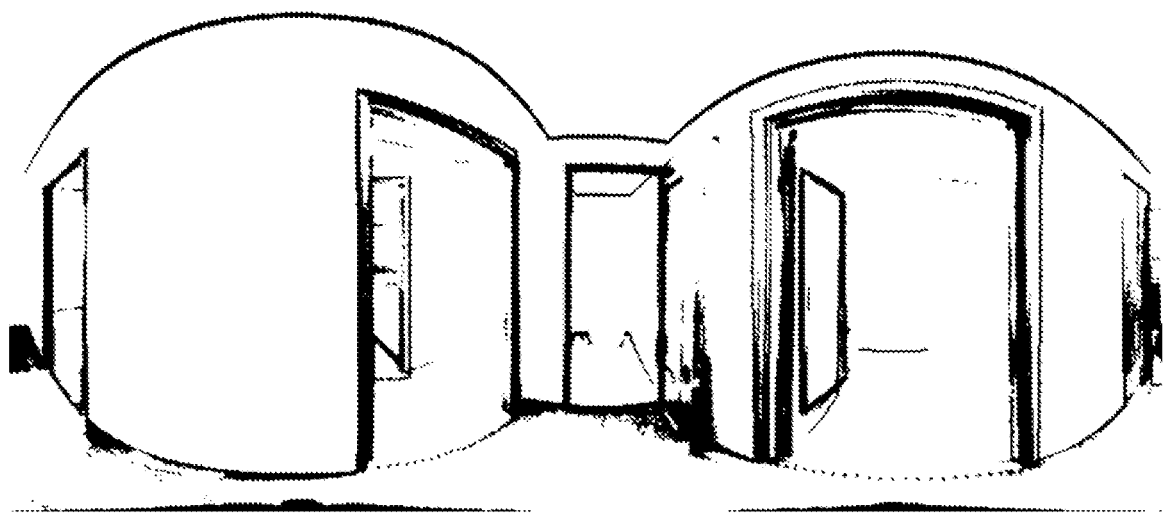
FIG. 2 is a schematic diagram illustrating an example of a channel in a panoramic image.

In the real world, a frame of a channel object is usually four annularly interconnected straight lines. However, in the first panoramic image, due to the influence of panoramic distortion and perspective changes, the channel object is usually four annularly interconnected arc-shaped sides. In the panoramic image shown in FIG. 2, a frame of a door may not be a straight line, but a curve. Each of the arc-shaped sides is a circular arc of a great circle. Here, the great circle is an intersecting line between a spherical surface of a spherical coordinate system and a plane that passes through the center of the sphere.

In the embodiment of the present disclosure, a deep learning network model is designed, the first panoramic image is input to the network model, and the channel object box of each channel object in the first panoramic image is predicted using the network model. The channel object box is four annularly interconnected arc-shaped sides, and each of the arc-shaped sides is a circular arc of a great circle.

Specifically, in the embodiment of the present disclosure, the channel object detection may be performed on the first panoramic image using a pre-trained deep learning network model, so as to obtain the channel object boxes in the first panoramic image. Specifically, geometric features of the channel object may be output. For example, the geometric features includes position information of four corner points of a channel (such as two-dimensional coordinate values (x, y) of the corner points in the first panoramic image), one or more included angles θ between two adjacent corner points on a unit sphere (the included angle is an angle whose vertex is a center of the sphere, and two sides are rays from the center of the sphere to the two corner points, and the included angle can reflect radian information of the two adjacent corner points on the unit sphere) and the like. Here, the included angles θ between any two corner points on the unit sphere may be output.

Using these geometric features, a curved polygonal box of the channel object can be generated. According to the network model for predicting the geometric features of the channel objects, both the distortion problem in the first panoramic image and the perspective change problem existing in the object itself can be solved. Furthermore, in addition to the geometric features, the network model may also output a category of each channel object, such as doors, windows, and wardrobes.

In the embodiment of the present disclosure, the deep learning network model may be obtained by performing training using a training sample set in advance. The training sample set includes a plurality of sample panoramic images, and geometric features of the channel object boxes labeled in each of the sample panoramic images. The geometric feature includes position coordinates of four corner points of the channel object box, and one or more included angles between two adjacent corner points on a unit sphere. A supervised training is performed on the model using the training sample set to obtain a desired network model.

Noted that the present disclosure is not limited to the execution sequence of step 11 and step 12. That is, step 11 may be performed first and then step 12 is performed, or step 12 may be performed first and then step 11 is performed, or step 11 and step 12 may be performed simultaneously.

In step 13, a three-dimensional point cloud of a channel object in the first panoramic image is generated based on the first panoramic image, the channel object boxes and the depth image.

Here, a two-dimensional point set of the channel object box in the first panoramic image, that is, two-dimensional coordinates of pixels of an outer contour of the channel object box in the first panoramic image may be calculated based on the geometric feature of the channel object box (the four corner points and the included angles between the adjacent corner points). Then, according to the two-dimensional point set of the channel object box, a position of the channel object box in the corresponding depth image may be determined. Then, depth information (three-dimensional space coordinates) of the pixels in the channel object box may be obtained based on the depth information in the depth image, thereby generating the three-dimensional point cloud of the channel object in the first panoramic image.

By the above steps, in the embodiment of the present disclosure, when detecting the channel object box in the first panoramic image, a rectangular detection box is not adopted, but a channel object box including a plurality of arc-shaped sides is introduced. The channel object box takes the influence of panoramic distortion and perspective changes into account, thus the generated channel object box can conform to the outer contour of the channel in the first panoramic image to achieve a tight fitting effect, which can improve the quality of the three-dimensional point cloud of the channel object subsequently generated based on the channel object box.

Figure 3:
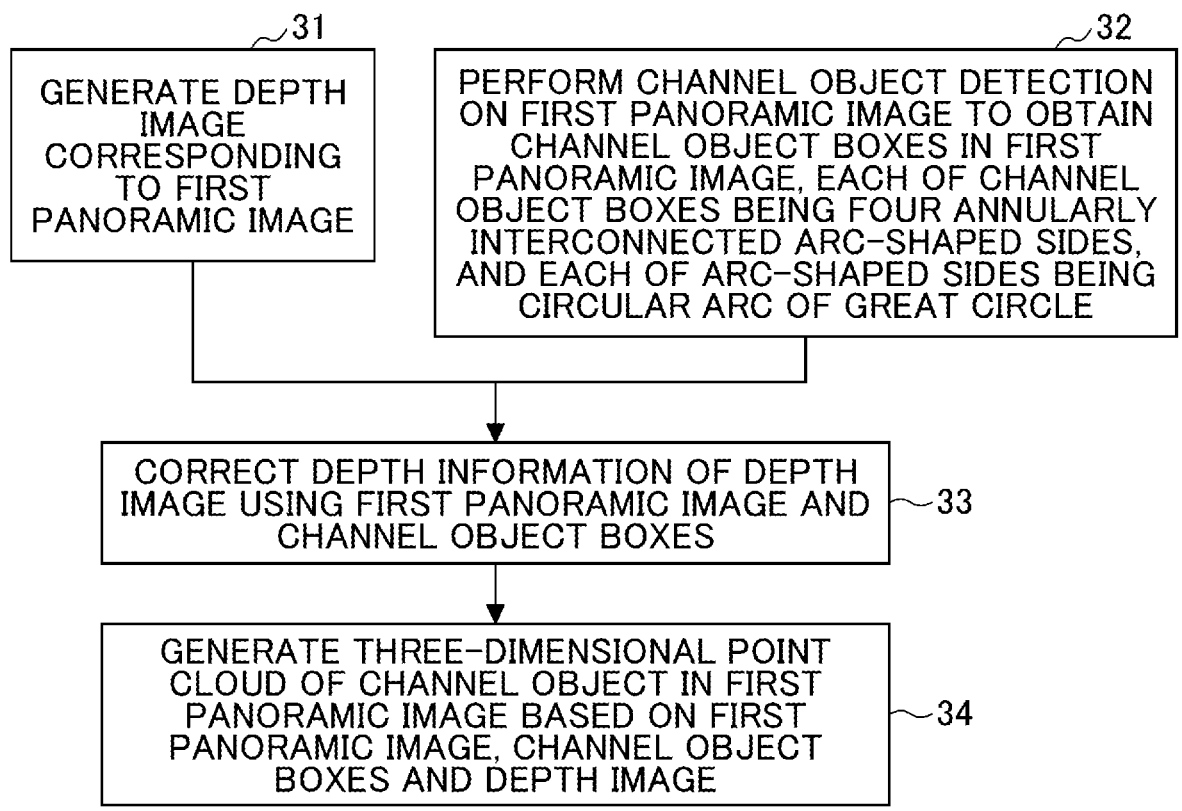
FIG. 3 is a flowchart illustrating another example of the three-dimensional channel constructing method according to the embodiment of the present disclosure.

Because laser light or visible light can pass through the channel object, in some scenes, the noise of the depth information in the channel object region may be very serious, which results in the unevenness of the finally generated three-dimensional channel point cloud. In the embodiment of the present disclosure, in order to further improve the quality of the three-dimensional channel point cloud, the depth information of the channel object region may be corrected before generating the three-dimensional point cloud. FIG. 3 is a flowchart illustrating another example of the three-dimensional channel constructing method according to the embodiment of the present disclosure. As shown in FIG. 3, the three-dimensional channel constructing method includes steps 31 to 34.

In step 31, a depth image corresponding to a first panoramic image is generated.

In step 32, channel object detection is performed on the first panoramic image to obtain channel object boxes in the first panoramic image. Here, each of the channel object boxes is four annularly interconnected arc-shaped sides, and each of the arc-shaped sides is a circular arc of a great circle.

Steps 31 and 32 may be steps 11 and 12 described above, and the detailed descriptions thereof are omitted here.

In step 33, depth information of the depth image is corrected using the first panoramic image and the channel object boxes.

Here, in the embodiment of the present disclosure, in order to reduce the noise of the depth information of the channel object region, the depth information of the depth image may be corrected.

In step 34, a three-dimensional point cloud of a channel object in the first panoramic image is generated based on the first panoramic image, the channel object boxes and the depth image.

Here, the depth image is repaired in step 33, and the three-dimensional point cloud of the channel object in the first panoramic image is generated based on the repaired depth image in step 34, thus the quality of the three-dimensional point cloud of the channel object can be further improved.

Figure 4:
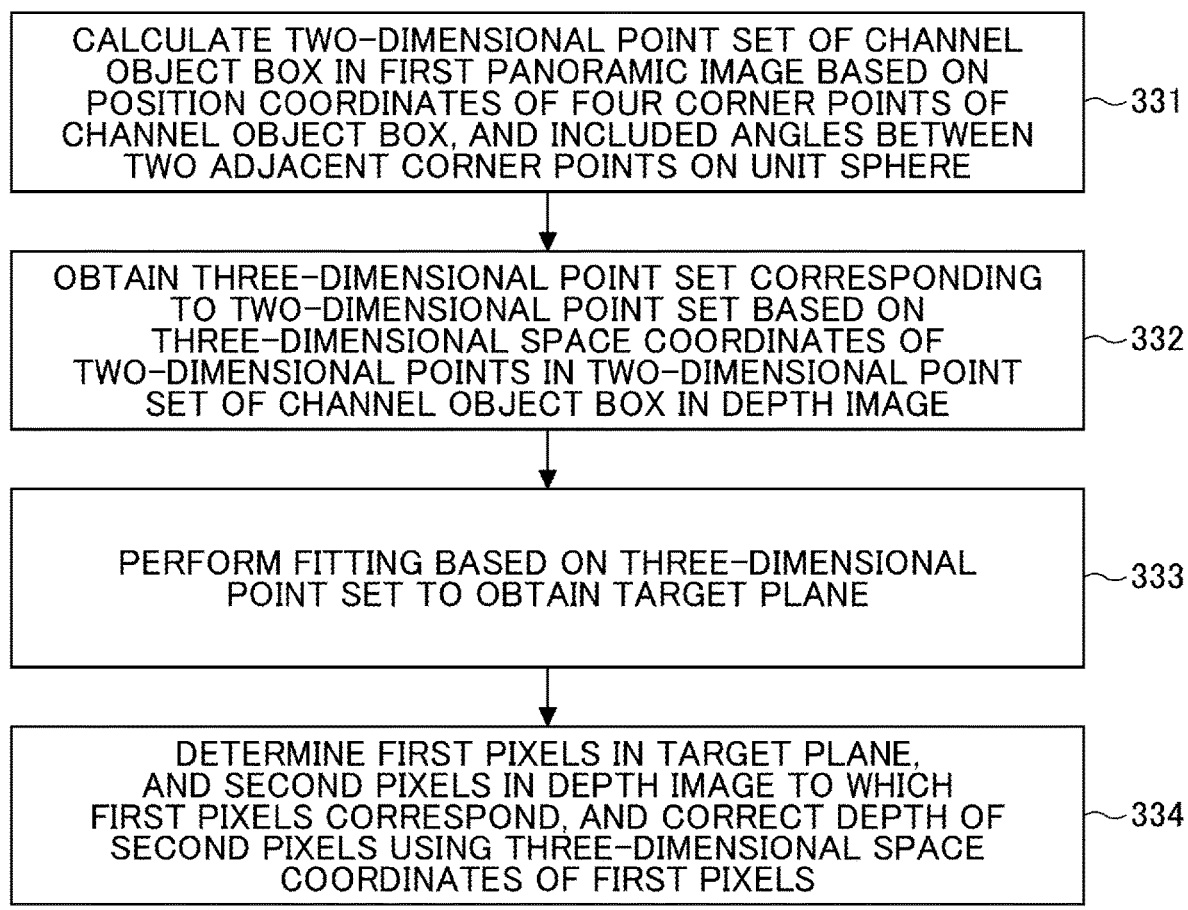
FIG. 4 is a flowchart illustrating a step of performing depth correction on a depth image according to the embodiment of the present disclosure.

In the following, the depth repairing in step 33 will be described in detail. FIG. 4 is a flowchart illustrating a step of performing depth correction on a depth image according to the embodiment of the present disclosure. As shown in FIG. 4, step 33 may include steps 331 to 334.

In step 331, a two-dimensional point set of the channel object box in the first panoramic image is calculated based on position coordinates of four corner points of the channel object box, and one or more included angles between two adjacent corner points on a unit sphere.

Here, the two-dimensional point set (a set of two-dimensional pixels) of the channel object box in the first panoramic image, that is, two-dimensional coordinates of pixels of an outer contour of the channel object box in the first panoramic image may be calculated based on the geometric feature of the channel object box (the four corner points and the included angles between the adjacent corner points).

Figure 5:
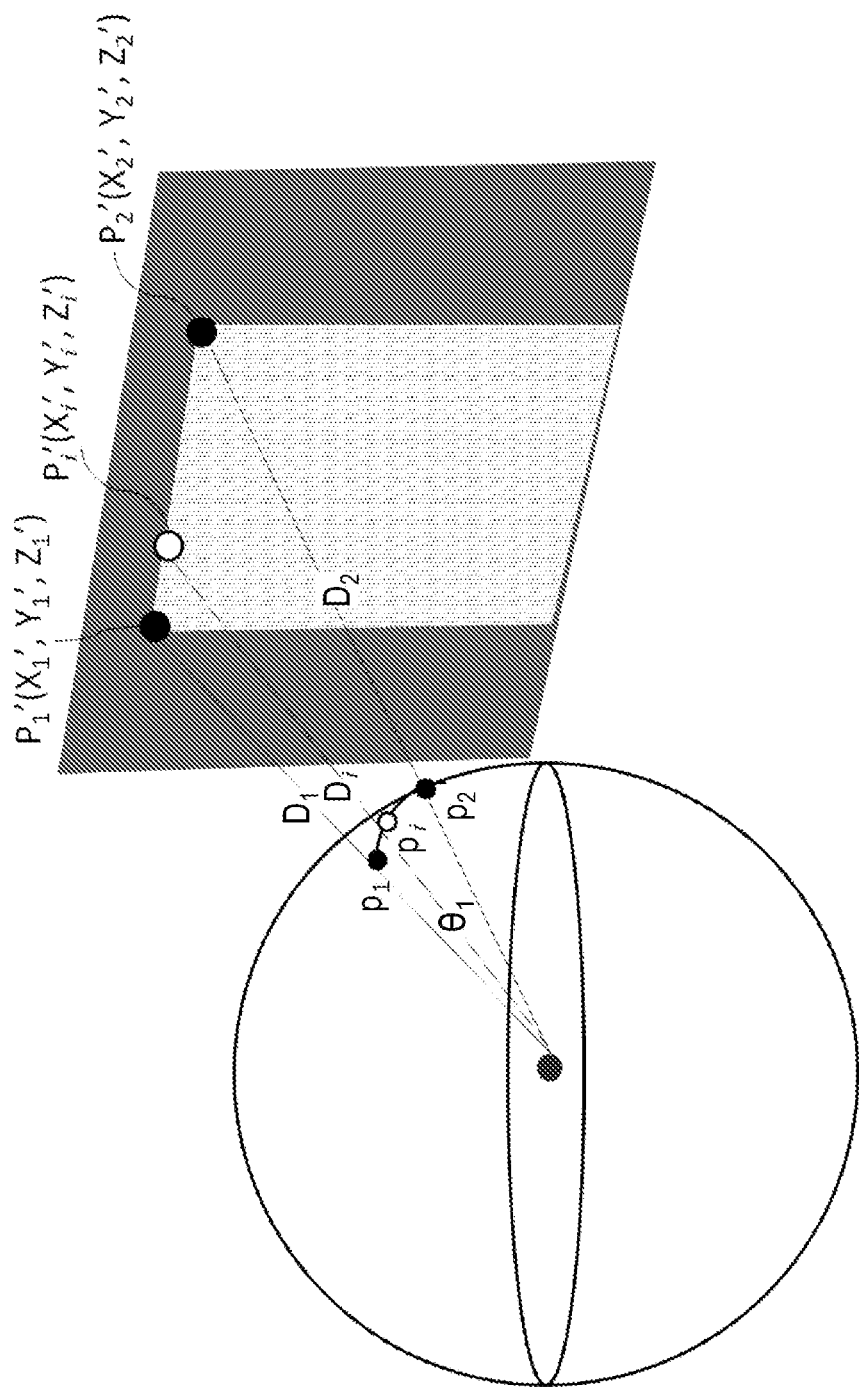
FIG. 5 is a schematic diagram illustrating an example of mapping of a channel object box in a spherical coordinate system according to the embodiment of the present disclosure.

For example, it is assumed that in the first panoramic image, position coordinates $(x_1, y_1), (x_2, y_2), (x_3, y_3), (x_4, y_4)$ of four corner points and included angles $(\theta_1, \theta_2, \theta_3, \theta_4)$ between the two adjacent corner points a channel object box are known, and two-dimensional point set $p(x_n, y_n)$ of the outer contour of the channel object box may be calculated. For example, as shown in FIG. 5, for adjacent corner points $p_1$ and $p_2$, it is assumed that the two-dimensional coordinates $(x_1, y_1)$ and $(x_2, y_2)$ of the adjacent corner points $p_1$ and $p_2$ in the first panoramic image, and the included angle $\theta_1$ between the two corner points are known, and three-dimensional coordinate of each pixel $p_i$ on an arc-shaped edge between the two corner points in the spherical coordinate system may be calculated according to the following formulas.

$$l_1=(x_1/2w-0.5)*2\Pi$$

$$l_2=(x_2/2w-0.5)*2\Pi$$

$$b_1=(0.5-y_1/w)*\Pi$$

$$b_2=(0.5-y_2/w)*\Pi$$

$$X_1=\cos(l_1)\cos(b_1)$$

$$X_2=\cos(l_2)\cos(b_2)$$

$$Y_1=\sin(l_1)\cos(b_1)$$

$$Y_2=\sin(l_2)\cos(b_2)$$

$$Z_1=\sin(b_1)$$

$$Z_2=\sin(b_2)$$

$$\varphi_i=\arccos(X_1*X_i+Y_1*Y_i+Z_1*Z_i)$$

$$X_i=(X_1\sin(\varphi_i-\theta_1)+X_2\sin(\varphi_i))/\sin(\varphi_i)$$

$$Y_i=(Y_1\sin(\varphi_i-\theta_1)+Y_2\sin(\varphi_i))/\sin(\varphi_i)$$

$$Z_i=(Z_1\sin(\varphi_i-\theta_1)+Z_2\sin(\varphi_i))/\sin(\varphi_i)$$

In the above formulas, $(l_1, b_1)$ and $(l_2, b_2)$ represent a longitude coordinate and a latitude coordinate of the corner points $p_1$ and $p_2$ on the spherical surface, respectively; $(X_1, Y_1, Z_1)$ and $(X_2, Y_2, Z_2)$ represent three-dimensional coordinates of the corner points $(x_1, y_1)$ and $(x_2, y_2)$ in the spherical coordinate system, respectively; $\varphi_1$ represents an included angle between pixel i and the corner point $(x_1, y_1)$, pixel $p_i$ is a pixel on an arc-shaped edge between the corner points $(x_1, y_1)$ and $(x_2, y_2)$; and $(X_i, Y_i, Z_i)$ represents three-dimensional coordinates of the pixel $p_i$ in the spherical coordinate system. Furthermore, w represents a width of the first panoramic image, and 2w represents a length of the first panoramic image. Generally, the panoramic image is a rectangular image with an aspect ratio of 2:1.

After calculating the three-dimensional coordinate of the pixel point $p_i$ in the spherical coordinate system, the three-dimensional coordinate in the spherical coordinate system is converted into the two-dimensional coordinate in the first panoramic image, so that the two-dimensional coordinates of pixels on the arc-shaped edge between the adjacent corner points $p_1$ and $p_2$ in the first panoramic image can be obtained. By performing similar calculations on other adjacent corner points, the two-dimensional coordinates of the pixels on all arc-shaped edges in the first panoramic image, that is, a two-dimensional point set of the channel object box in the first panoramic image can be finally obtained.

In step 332, a three-dimensional point set corresponding to the two-dimensional point set is obtained based on three-dimensional space coordinates of two-dimensional points in the two-dimensional point set of the channel object box in the depth image.

Here, according to the two-dimensional point set of the channel object box, the position of the channel object box in the depth image corresponding to the first panoramic image can be determined, and then the three-dimensional space coordinates (that is, the depth information) of two-dimensional point in the channel object box in the depth image can be obtained, so as to obtain a set of three-dimensional points. The coordinates of three-dimensional points in the set represent the position information of the outer contour of the channel object box in three-dimensional space.

In step 333, fitting is performed based on the three-dimensional point set to obtain a target plane.

Here, in the real world, the channel object is usually a plane, and theoretically the above three-dimensional point set should be on the same plane. In the embodiment of the present disclosure, a target plane may be obtained by performing fitting according to the three-dimensional space coordinates of the outer contour of the channel object box, so as to reflect the plane information of the channel object in the real world. Specifically, in the fitting, a sum of distances from points in the three-dimensional point set to the target plane may be used as an optimization target, and an optimal plane that minimizes the sum value may be used as the target plane. The three-dimensional space coordinates of the points in the target plane are the depth information inside the channel object box. For example, algorithms such as a RANdom SAmple Consensus (RANSAC) algorithm may be used to perform fitting on the three-dimensional point set so that $AX'+BY'+CZ'=D$, thereby obtaining the target plane. Here, (X', Y', Z') represent a three-dimensional space coordinate, and A, B, C and D are constants of plane space features. In FIG. 5, $P_1'$ $(X_1', Y_1', Z_1')$ $P_2'$ $(X_2', Y_2', Z_2')$ and $P_i'$ $(X_i', Y_i', Z_i')$ represent the three-dimensional space coordinates of $p_1$, $p_2$ and $p_i$ in the target plane, respectively. Furthermore, $D_1$, $D_2$ and $D_i$ represent the depth information, that is, the depth information after depth correction of $p_1$, $p_2$ and $p_i$, respectively.

In step 334, first pixels in the target plane, and second pixels in the depth image to which the first pixels correspond are determined, and depth of the second pixels are corrected using the three-dimensional space coordinates of the first pixels.

After obtaining the target plane, each pixel in the target plane (for ease of description, called the first pixel) is calculated, and is mapped to the corresponding pixel of the depth image (for ease of description, called the second pixel). Here, the second pixel corresponding to the first pixel may be calculated by using trigonometric functions and longitude-latitude mapping. Then, the three-dimensional space coordinates (that is, depth information) of the first pixel point are used as the depth information of the corresponding second pixel point, so as to correct the depth information in the depth image.

By the above steps, in the embodiment of the present disclosure, the depth information in the channel object box is corrected, thereby further improving the quality of the subsequently generated three-dimensional point cloud of the channel object.

The step of generating the three-dimensional point cloud of a corresponding channel object for a panoramic image is described above. In practical applications, a group of panoramic images of the target space may be photographed (the group of panoramic images may be a plurality of panoramic images extracted from a photographed panoramic video of the target space). And then, for each of the panoramic images, the steps of the above method in the embodiment of the present disclosure may be executed to obtain the three-dimensional point cloud of the channel object in each panoramic image. Here, the first panoramic image is any panoramic image in the above-mentioned group of panoramic images. In this way, the three-dimensional point cloud of the channel object in the target space may be generated according to the three-dimensional point cloud of the channel object in each panoramic image of the target space. For example, the three-dimensional channel point cloud may be generated using a three-dimensional point cloud registration method in the conventional technology, such as an ICP method, a Multiway Registration method or the like.

In addition, when actually photographing a panoramic image (or a panoramic video), there are usually images of a photographer or a photographing equipment (such as a camera tripod or the like) in the panoramic image. Accordingly, when generating the depth image corresponding to the panoramic image, the images of the photographer or the photographing equipment will be noisy. In order to reduce the noise influence of the above object on the depth image, in the above method of the embodiment of the present disclosure, for example, in the above step 11, or in the above step 31, in the process of generating the depth image corresponding to the panoramic image, the following steps may be introduced to denoise the depth image. A preset target object is detected from the panoramic image, and the position coordinates of the preset target object are obtained. Here, the preset target object specifically includes a person and/or a tripod or the like. Then, the depth information of the corresponding pixel in the depth image is deleted according to the position coordinates of the preset target object, that is, the depth information of the corresponding pixel is set to zero. Through the above processing, in the embodiment of the present disclosure, the quality of the depth image can be improved, and the quality of the subsequently generated three-dimensional point cloud of the channel object can be improved.

Compared with the conventional technology, by the three-dimensional channel constructing method according to the embodiment of the present disclosure, not only the panoramic distortion of the panoramic image but also the perspective changes of the channel object itself are considered, thus a high-quality three-dimensional channel point cloud can be generated. Furthermore, in the embodiment of the present disclosure, the depth information in the three-dimensional channel object box is corrected, thus the quality of the three-dimensional channel point cloud can be further improved.

Based on the above three-dimensional channel constructing method according to the above embodiment, in another embodiment of the present disclosure, a non-transitory computer-readable recording medium having computer-executable instructions for execution by one or more processors is further provided. The execution of the computer-executable instructions cause the one or more processors to carry out the three-dimensional channel constructing method according the above embodiment.

Figure 6:
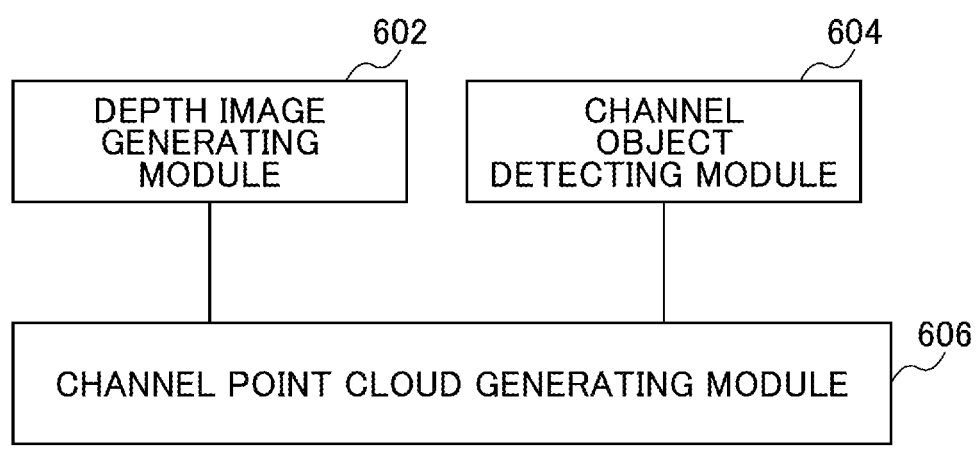
FIG. 6 is a block diagram illustrating an example of a configuration of a three-dimensional channel constructing apparatus according to another embodiment of the present disclosure.

Based on the above three-dimensional channel constructing method according to the above embodiment, in another embodiment of the present disclosure, a three-dimensional channel constructing apparatus is further provided. FIG. 6 is a block diagram illustrating an example of a configuration of the three-dimensional channel constructing apparatus according to another embodiment of the present disclosure. As shown in FIG. 6, the three-dimensional channel constructing apparatus includes a depth image generating module 602, a channel object detecting module 604, and a channel point cloud generating module 606.

The depth image generating module 602 generates a depth image corresponding to a first panoramic image.

The channel object detecting module 604 performs channel object detection on the first panoramic image to obtain channel object boxes in the first panoramic image. Each of the channel object boxes is four annularly interconnected arc-shaped sides, and each of the arc-shaped sides is a circular arc of a great circle.

The channel point cloud generating module 606 generates a three-dimensional point cloud of a channel object in the first panoramic image based on the first panoramic image, the channel object boxes and the depth image.

By the above modules, a channel object box including a plurality of arc-shaped sides is introduced in three-dimensional channel constructing apparatus according to the embodiment of the present disclosure. The channel object box takes the influence of panoramic distortion and perspective changes into account, thus the generated channel object box can conform to the outer contour of the channel in the first panoramic image, which can improve the quality of the three-dimensional point cloud of the channel object subsequently generated based on the channel object box.

Figure 7:
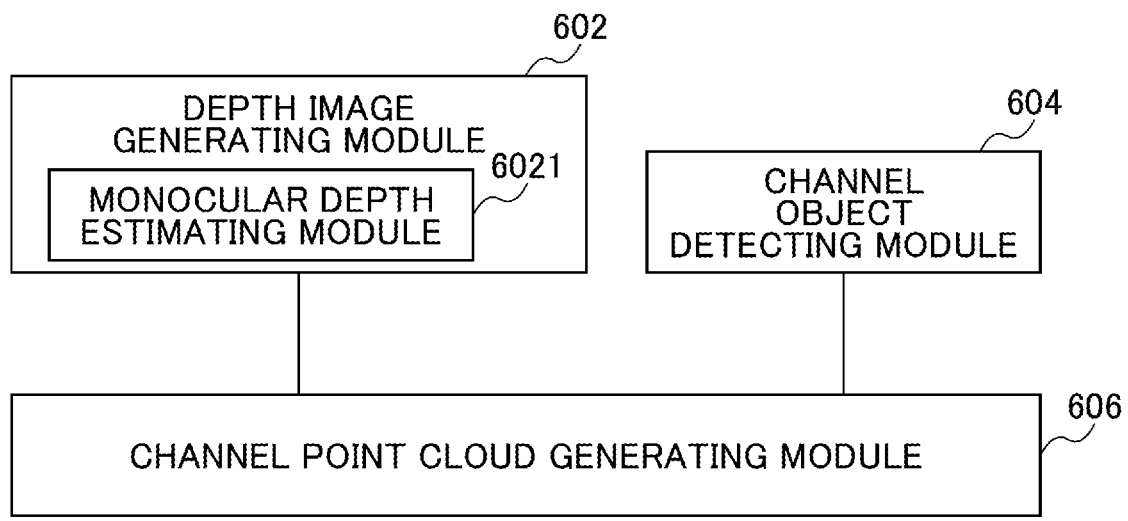
FIG. 7 is a block diagram illustrating another example of the configuration of the three-dimensional channel constructing apparatus according to the embodiment of the present disclosure.

FIG. 7 is a block diagram illustrating another example of the configuration of the three-dimensional channel constructing apparatus according to the embodiment of the present disclosure. as shown in FIG. 7, as an implementation example, the depth image generating module 602 of the embodiment of the present disclosure includes a monocular depth estimating module 6021.

The monocular depth estimating module 6021 performs monocular depth estimation on the first panoramic image to obtain the depth image. Here, a resolution of the depth image is identical to a resolution of the first panoramic image.

Figure 8:
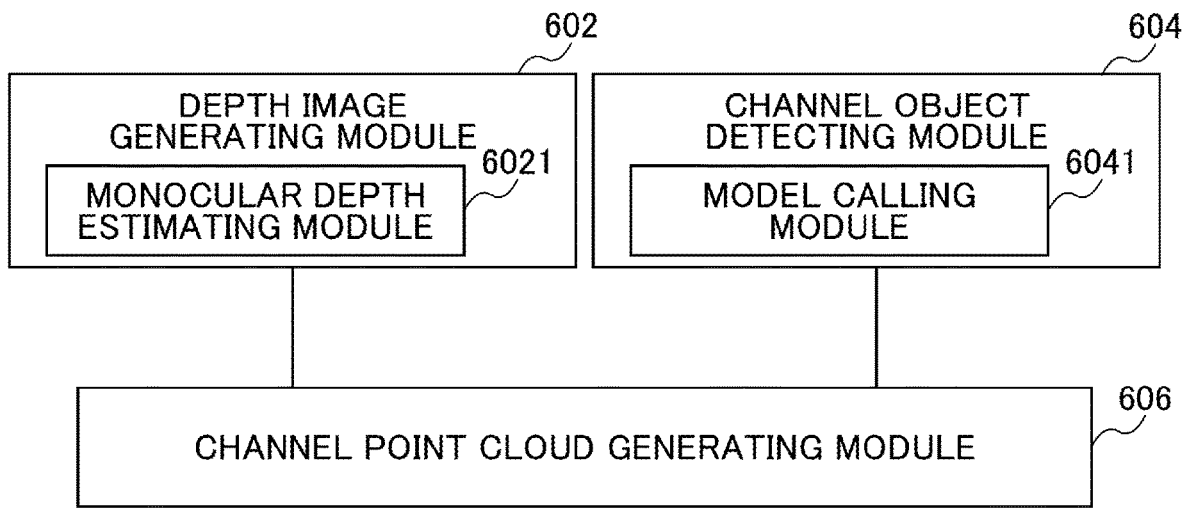
FIG. 8 is a block diagram illustrating another example of the configuration of the three-dimensional channel constructing apparatus according to the embodiment of the present disclosure.

FIG. 8 is a block diagram illustrating another example of the configuration of the three-dimensional channel constructing apparatus according to the embodiment of the present disclosure. As shown in FIG. 8, the channel object detecting module 604 includes a model calling module 6041.

The model calling module 6041 performs the channel object detection on the first panoramic image using a pre-trained deep learning network model to obtain the channel object boxes in the first panoramic image. Here, the deep learning network model is obtained by training using a training sample set. The training sample set includes a plurality of sample panoramic images, and geometric features of the channel object boxes labeled in each of the sample panoramic images. The geometric feature includes position coordinates of four corner points of the channel object box, and one or more included angles between two adjacent corner points on a unit sphere.

Figure 9:
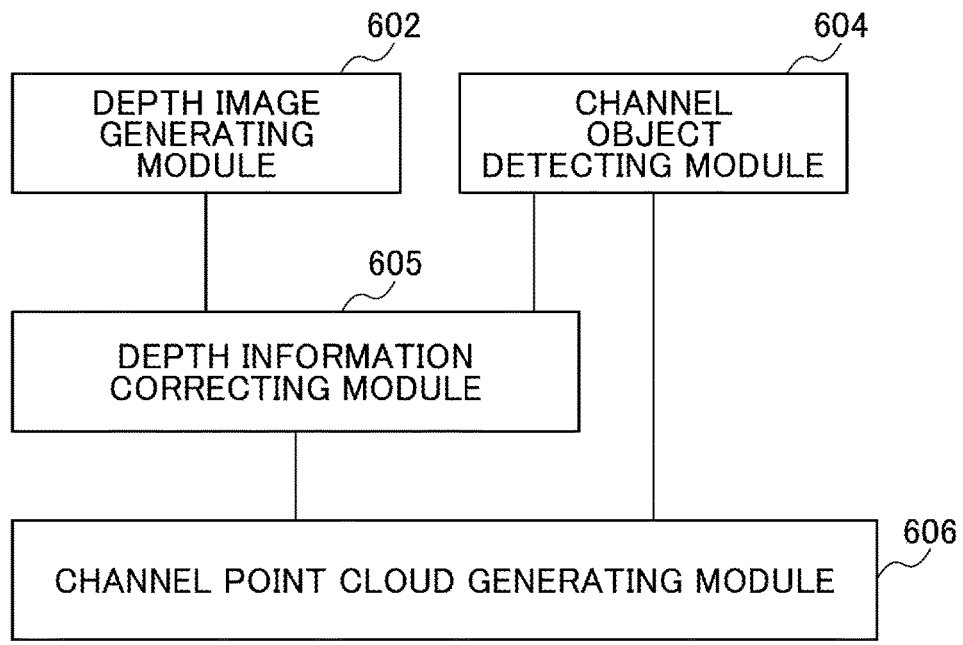
FIG. 9 is a block diagram illustrating another example of the configuration of the three-dimensional channel constructing apparatus according to the embodiment of the present disclosure.

FIG. 9 is a block diagram illustrating another example of the configuration of the three-dimensional channel constructing apparatus according to the embodiment of the present disclosure. As shown in FIG. 9. the three-dimensional channel constructing apparatus may further include a depth information correcting module 605.

The depth information correcting module 605 corrects depth information of the depth image using the first panoramic image and the channel object boxes, before the channel point cloud generating module 606 generates the three-dimensional point cloud of the channel object in the first panoramic image.

Figure 10:
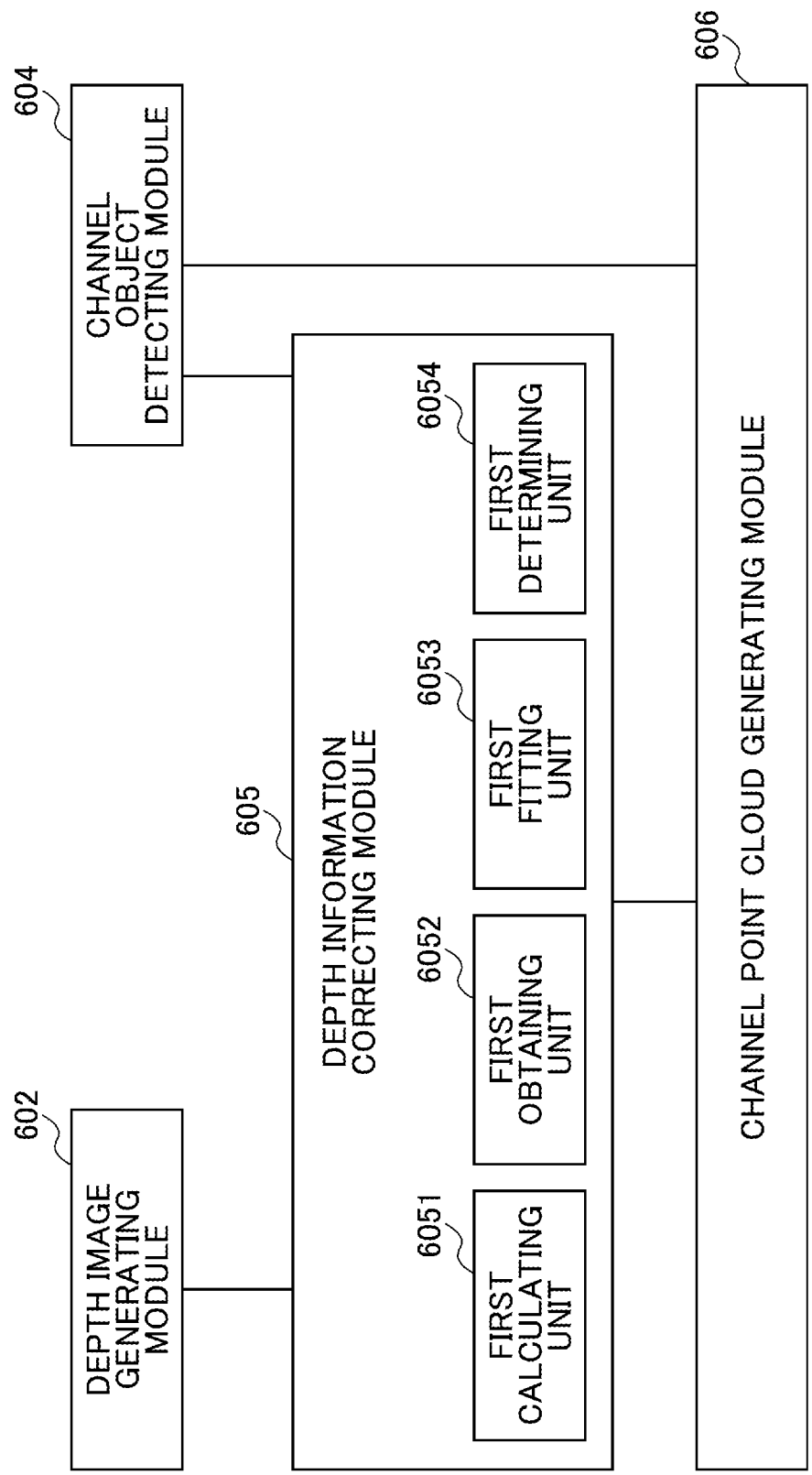
FIG. 10 is a block diagram illustrating another example of the configuration of the three-dimensional channel constructing apparatus according to the embodiment of the present disclosure.

FIG. 10 is a block diagram illustrating another example of the configuration of the three-dimensional channel constructing apparatus according to the embodiment of the present disclosure. Preferably, as shown in FIG. 10, the depth information correcting module 605 specifically includes a first calculating unit 6051, a first obtaining unit 6052, a first fitting unit 6053, and a first determining unit 6054.

The first calculating unit 6051 calculates a two-dimensional point set of the channel object box in the first panoramic image, based on position coordinates of four corner points of the channel object box, and one or more included angles between two adjacent corner points on a unit sphere.

The first obtaining unit 6052 obtains a three-dimensional point set corresponding to the two-dimensional point set, based on three-dimensional space coordinates of two-dimensional points in the two-dimensional point set of the channel object box in the depth image.

The first fitting unit 6053 performs fitting based on the three-dimensional point set to obtain a target plane.

The first determining unit 6054 determines first pixels in the target plane, and second pixels in the depth image to which the first pixels correspond, and corrects depth of the second pixels using the three-dimensional space coordinates of the first pixels.

Figure 11:
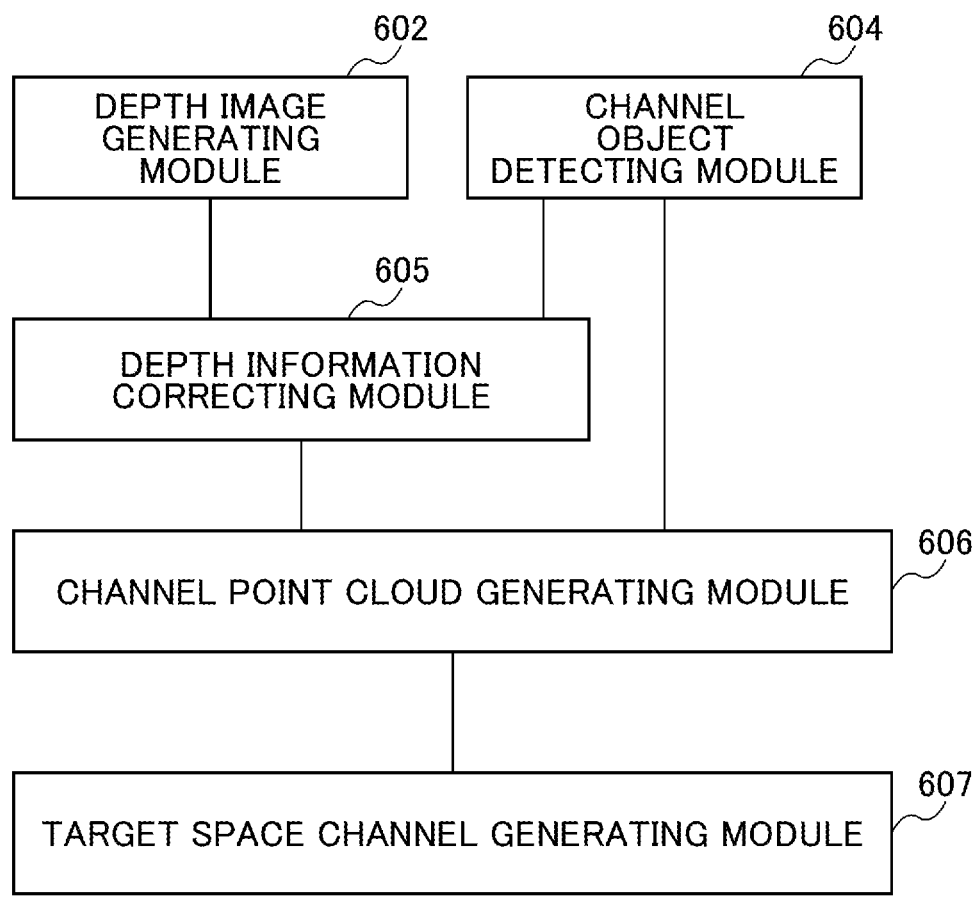
FIG. 11 is a block diagram illustrating another example of the configuration of the three-dimensional channel constructing apparatus according to the embodiment of the present disclosure.

Preferably, the first panoramic image is any panoramic image in a group of panoramic images obtained by photographing a target space. FIG. 11 is a block diagram illustrating another example of the configuration of the three-dimensional channel constructing apparatus according to the embodiment of the present disclosure. As shown in FIG. 11, the three-dimensional channel constructing apparatus according to the embodiment of the present disclosure further includes a target space channel generating module 607.

The target space channel generating module 607 generates the three-dimensional point clouds of the channel objects in the target space, based on the three-dimensional point clouds of one or more channel objects in the panoramic images of the target space.

Figure 12:
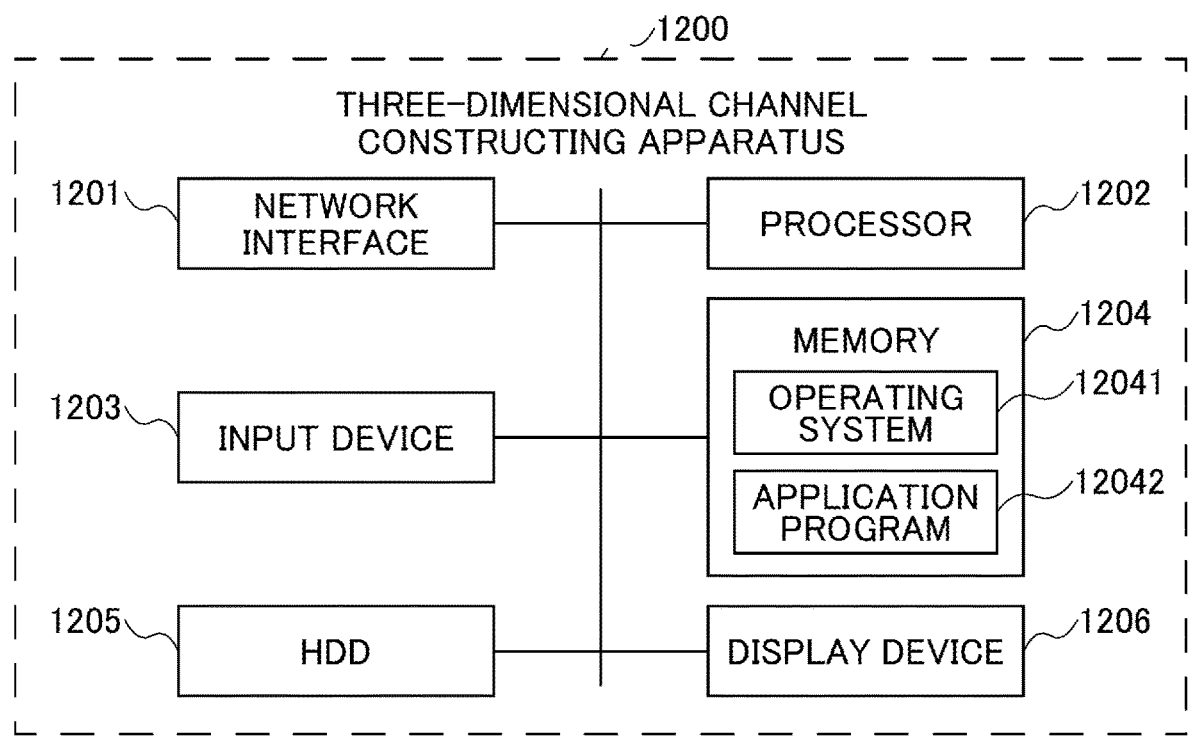
FIG. 12 is a block diagram illustrating an example of a configuration of a three-dimensional channel constructing apparatus according to another embodiment of the present disclosure.

FIG. 12 is a block diagram illustrating an example of a configuration of a three-dimensional channel constructing apparatus according to another embodiment of the present disclosure. As shown in FIG. 12, the three-dimensional channel constructing apparatus 1200 includes a processor 1202, and a memory 1204 storing computer-executable instructions.

When the computer-executable instructions are executed by the processor 1202, the processor 1202 are configured to perform the following steps A, B, and C.

In step A, a depth image corresponding to a first panoramic image is generated.

In step B, channel object detection is performed on the first panoramic image to obtain channel object boxes in the first panoramic image. Here, each of the channel object boxes is four annularly interconnected arc-shaped sides, and each of the arc-shaped sides is a circular arc of a great circle.

In step C, a three-dimensional point cloud of a channel object in the first panoramic image is generated, based on the first panoramic image, the channel object boxes and the depth image.

Furthermore, as shown in FIG. 12, the three-dimensional channel constructing apparatus 1200 further includes a network interface 1201, an input device 1203, a hard disk drive (HDD) 1205, and a display device 1206.

Each of the ports and each of the devices may be connected to each other via a bus architecture. The processor 1202, such as one or more central processing units (CPUs), and the memory 1204, such as one or more memory units, may be connected via various circuits. Other circuits such as an external device, a regulator, and a power management circuit may also be connected via the bus architecture. Note that these devices are communicably connected via the bus architecture. The bus architecture includes a power supply bus, a control bus and a status signal bus besides a data bus. The detailed description of the bus architecture is omitted here.

The network interface 1201 may be connected to a network (such as the Internet, a LAN or the like), receive data (such as a panoramic image) from the network, and store the received data in the hard disk drive 1205.

The input device 1203 may receive various commands such as predetermined threshold and its setting information input by a user, and transmit the commands to the processor 1202 to be executed. The input device 1203 may include a keyboard, pointing devices (such as a mouse or a track ball), a touch board, a touch panel or the like.

The display device 1206 may display a result obtained by executing the commands, for example, a visualized image of the constructed three-dimensional channel and the like.

The memory 1204 stores programs and data required for running an operating system, and data such as intermediate results in calculation processes of the processor 1202.

Note that the memory 1204 of the embodiments of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which may be used as an external high-speed buffer. The memory 1204 of the apparatus or the method is not limited to the described types of memory, and may include any other suitable memory.

In some embodiments, the memory 1204 stores executable modules or data structure, their subsets, or their superset, i.e., an operating system (OS) 12041 and an application program 12042.

The operating system 12041 includes various system programs for implementing various essential tasks and processing tasks based on hardware, such as a frame layer, a core library layer, a drive layer and the like. The application program 12042 includes various application programs for implementing various application tasks, such as a browser and the like. A program for realizing the method according to the embodiments of the present disclosure may be included in the application program 12042.

The method according to the above embodiments of the present disclosure may be applied to the processor 1202 or may be implemented by the processor 1202. The processor 1202 may be an integrated circuit chip capable of processing signals. Each step of the above method may be implemented by instructions in a form of integrated logic circuit of hardware in the processor 1202 or a form of software. The processor 1202 may be a general-purpose processor, a digital signal processor (DSP), an application specific integrated circuit (ASIC), field programmable gate array signals (FPGA) or other programmable logic device (PLD), a discrete gate or transistor logic, discrete hardware components capable of realizing or executing the methods, the steps and the logic blocks of the embodiments of the present disclosure. The general-purpose processor may be a micro-processor, or alternatively, the processor may be any common processor. The steps of the method according to the embodiments of the present disclosure may be realized by a hardware decoding processor, or combination of hardware modules and software modules in a decoding processor. The software modules may be located in a conventional storage medium such as a random access memory (RAM), a flash memory, a read-only memory (ROM), a erasable programmable read-only memory (EPROM), an electrically erasable programmable read-only memory (EEPROM), a register or the like. The storage medium is located in the memory 1204, and the processor 1202 reads information in the memory 1204 and realizes the steps of the above methods in combination with hardware.

Note that the embodiments described herein may be realized by hardware, software, firmware, intermediate code, microcode or any combination thereof. For hardware implementation, the processor may be realized in one or more application specific integrated circuits (ASIC), digital signal processors (DSP), digital signal processing devices (DSPD), programmable logic devices (PLD), field programmable gate array signals (FPGA), general-purpose processors, controllers, micro-controllers, micro-processors, or other electronic components or their combinations for realizing functions of the present disclosure.

For software implementation, the embodiments of the present disclosure may be realized by executing functional modules (such as processes, functions or the like). Software codes may be stored in a memory and executed by a processor. The memory may be implemented inside or outside the processor.

Preferably, when the computer-readable instructions are executed by the processor 1202, the processor 1202 is configured to perform monocular depth estimation on the first panoramic image to obtain the depth image. Here, a resolution of the depth image is identical to a resolution of the first panoramic image.

Preferably, when the computer-readable instructions are executed by the processor 1202, the processor 1202 is configured to perform, using a pre-trained deep learning network model, the channel object detection on the first panoramic image to obtain the channel object boxes in the first panoramic image. Here, the deep learning network model is obtained by training using a training sample set. The training sample set includes a plurality of sample panoramic images, and geometric features of the channel object boxes labeled in each of the sample panoramic images. The geometric feature includes position coordinates of four corner points of the channel object box, and one or more included angles between two adjacent corner points on a unit sphere.

Preferably, when the computer-readable instructions are executed by the processor 1202, the processor 1202 is configured to correct depth information of the depth image using the first panoramic image and the channel object boxes.

Preferably, when the computer-readable instructions are executed by the processor 1202, the processor 1202 is configured to calculate, based on position coordinates of four corner points of the channel object box, and one or more included angles between two adjacent corner points on a unit sphere, a two-dimensional point set of the channel object box in the first panoramic image; obtain, based on three-dimensional space coordinates of two-dimensional points in the two-dimensional point set of the channel object box in the depth image, a three-dimensional point set corresponding to the two-dimensional point set; perform fitting based on the three-dimensional point set to obtain a target plane; and determine first pixels in the target plane, and second pixels in the depth image to which the first pixels correspond, and correct depth of the second pixels using the three-dimensional space coordinates of the first pixels.

Preferably, the first panoramic image is any panoramic image in a group of panoramic images obtained by photographing a target space. Preferably, when the computer-readable instructions are executed by the processor 1202, the processor 1202 is configured to generate the three-dimensional point clouds of the channel objects in the target space, based on the three-dimensional point clouds of one or more channel objects in the panoramic images of the target space.

As known by a person skilled in the art, the elements and algorithm steps of the embodiments disclosed herein may be implemented by electronic hardware or a combination of computer software and electronic hardware. Whether these functions are performed by hardware or software depends on the specific application and design constraints of the solution. A person skilled in the art may use different methods for implementing the described functions for each particular application, but such implementation should not be considered to be beyond the scope of the present disclosure.

As clearly understood by a person skilled in the art, for the convenience and brevity of the description, the specific working process of the system, the device and the unit described above may refer to the corresponding process in the above method embodiment, and detailed descriptions thereof are omitted here.

In the embodiments of the present application, it should be understood that the disclosed apparatus and method may be implemented in other manners. For example, the device embodiments described above are merely illustrative. For example, the division of the unit is only a logical function division. In actual implementation, there may be another division manner, for example, units or components may be combined or be integrated into another system, or some features may be ignored or not executed. In addition, the coupling or direct coupling or communication connection described above may be an indirect coupling or communication connection through some interface, device or unit, and may be electrical, mechanical or the like.

The units described as separate components may be or may not be physically separated, and the components displayed as units may be or may not be physical units, that is to say, the units may be located in one place, or may be distributed across network units. Some or all of the units may be selected according to actual needs to achieve the objectives of the embodiments of the present disclosure.

In addition, each functional unit the embodiments of the present disclosure may be integrated into one processing unit, or each unit may exist physically separately, or two or more units may be integrated into one unit.

The functions may be stored in a computer readable storage medium if the functions are implemented in the form of a software functional unit and sold or used as an independent product. Based on such understanding, the technical solution of the present disclosure, which is essential or contributes to the prior art, or a part of the technical solution, may be embodied in the form of a software product, which is stored in a storage medium, including instructions that are used to cause a computer device (which may be a personal computer, a server, or a network device, etc.) to perform all or a part of the steps of the methods described in the embodiments of the present disclosure. The above storage medium includes various media that can store program codes, such as a USB flash drive, a mobile hard disk, a ROM, a RAM, a magnetic disk, or an optical disk.

The present disclosure is not limited to the specifically described embodiments, and various modifications, combinations and replacements may be made without departing from the scope of the present disclosure.

What is claimed is:

1. A method for constructing a three-dimensional channel, the method comprising:
    generating a depth image corresponding to a first panoramic image;
    performing channel object detection on the first panoramic image to obtain channel object boxes in the first panoramic image, each of the channel object boxes being four annularly interconnected arc-shaped sides, and each of the arc-shaped sides being a circular arc of a great circle;
    generating, based on the first panoramic image, the channel object boxes and the depth image, a three-dimensional point cloud of a channel object in the first panoramic image; and
    correcting, using the first panoramic image and the channel object boxes, depth information of the depth image, before generating the three-dimensional point cloud of the channel object in the first panoramic image,
    wherein correcting the depth information of the depth image using the first panoramic image and the channel object boxes includes
        calculating, based on position coordinates of four corner points of the channel object box, and one or more included angles between two adjacent corner points on a unit sphere, a two-dimensional point set of the channel object box in the first panoramic image,
        obtaining, based on three-dimensional space coordinates of two-dimensional points in the two-dimensional point set of the channel object box in the depth image, a three-dimensional point set corresponding to the two-dimensional point set,
        performing fitting based on the three-dimensional point set to obtain a target plane, and
        determining first pixels in the target plane, and second pixels in the depth image to which the first pixels correspond, and correcting depth of the second pixels using the three-dimensional space coordinates of the first pixels.

2. The method for constructing a three-dimensional channel as claimed in claim 1,
    wherein generating the depth image corresponding to the first panoramic image includes
        performing monocular depth estimation on the first panoramic image to obtain the depth image, and
    wherein a resolution of the depth image is identical to a resolution of the first panoramic image.

3. The method for constructing a three-dimensional channel as claimed in claim 1,
    wherein performing the channel object detection on the first panoramic image to obtain the channel object boxes in the first panoramic image includes
        performing, using a pre-trained deep learning network model, the channel object detection on the first panoramic image to obtain the channel object boxes in the first panoramic image,
    wherein the deep learning network model is obtained by training using a training sample set,
    wherein the training sample set includes a plurality of sample panoramic images, and geometric features of the channel object boxes labeled in each of the sample panoramic images, and
    wherein the geometric feature includes position coordinates of four corner points of the channel object box, and one or more included angles between two adjacent corner points on a unit sphere.

4. The method for constructing a three-dimensional channel as claimed in claim 1,
    wherein the first panoramic image is any panoramic image in a group of panoramic images obtained by photographing a target space, and
    wherein the method further includes
        generating, based on the three-dimensional point clouds of one or more channel objects in the panoramic images of the target space, the three-dimensional point clouds of the channel objects in the target space.

5. An apparatus for constructing a three-dimensional channel, the apparatus comprising:
    a memory storing computer-executable instructions; and
    one or more processors configured to execute the computer-executable instructions such that the one or more processors are configured to
        generate a depth image corresponding to a first panoramic image;
        perform channel object detection on the first panoramic image to obtain channel object boxes in the first panoramic image, each of the channel object boxes being four annularly interconnected arc-shaped sides, and each of the arc-shaped sides being a circular arc of a great circle;
        generate, based on the first panoramic image, the channel object boxes and the depth image, a three-dimensional point cloud of a channel object in the first panoramic image;
        correct, using the first panoramic image and the channel object boxes, depth information of the depth image, before generating the three-dimensional point cloud of the channel object in the first panoramic image;
        calculate, based on position coordinates of four corner points of the channel object box, and one or more included angles between two adjacent corner points on a unit sphere, a two-dimensional point set of the channel object box in the first panoramic image;
        obtain, based on three-dimensional space coordinates of two-dimensional points in the two-dimensional point set of the channel object box in the depth image, a three-dimensional point set corresponding to the two-dimensional point set;
        perform fitting based on the three-dimensional point set to obtain a target plane; and
        determine first pixels in the target plane, and second pixels in the depth image to which the first pixels correspond, and correct depth of the second pixels using the three-dimensional space coordinates of the first pixels.

6. The apparatus for constructing a three-dimensional channel as claimed in claim 5,
    wherein the one or more processors are configured to
        perform monocular depth estimation on the first panoramic image to obtain the depth image, and
    wherein a resolution of the depth image is identical to a resolution of the first panoramic image.

7. The apparatus for constructing a three-dimensional channel as claimed in claim 5,
    wherein the one or more processors are configured to
        perform, using a pre-trained deep learning network model, the channel object detection on the first panoramic image to obtain the channel object boxes in the first panoramic image,
    wherein the deep learning network model is obtained by training using a training sample set, wherein the training sample set includes a plurality of sample panoramic images, and geometric features of the channel object boxes labeled in each of the sample panoramic images, and wherein the geometric feature includes position coordinates of four corner points of the channel object box, and one or more included angles between two adjacent corner points on a unit sphere.

8. The apparatus for constructing a three-dimensional channel as claimed in claim 5, wherein the first panoramic image is any panoramic image in a group of panoramic images obtained by photographing a target space, and wherein the one or more processors are further configured to generate, based on the three-dimensional point clouds of one or more channel objects in the panoramic images of the target space, the three-dimensional point clouds of the channel objects in the target space.

9. A non-transitory computer-readable recording medium having computer-executable instructions for execution by one or more processors, wherein the computer-executable instructions, when executed, cause the one or more processors to carry out the method for constructing a three-dimensional channel as claimed in claim 1.

* * * * *